United States Patent Office 3,387,332
Patented June 11, 1968

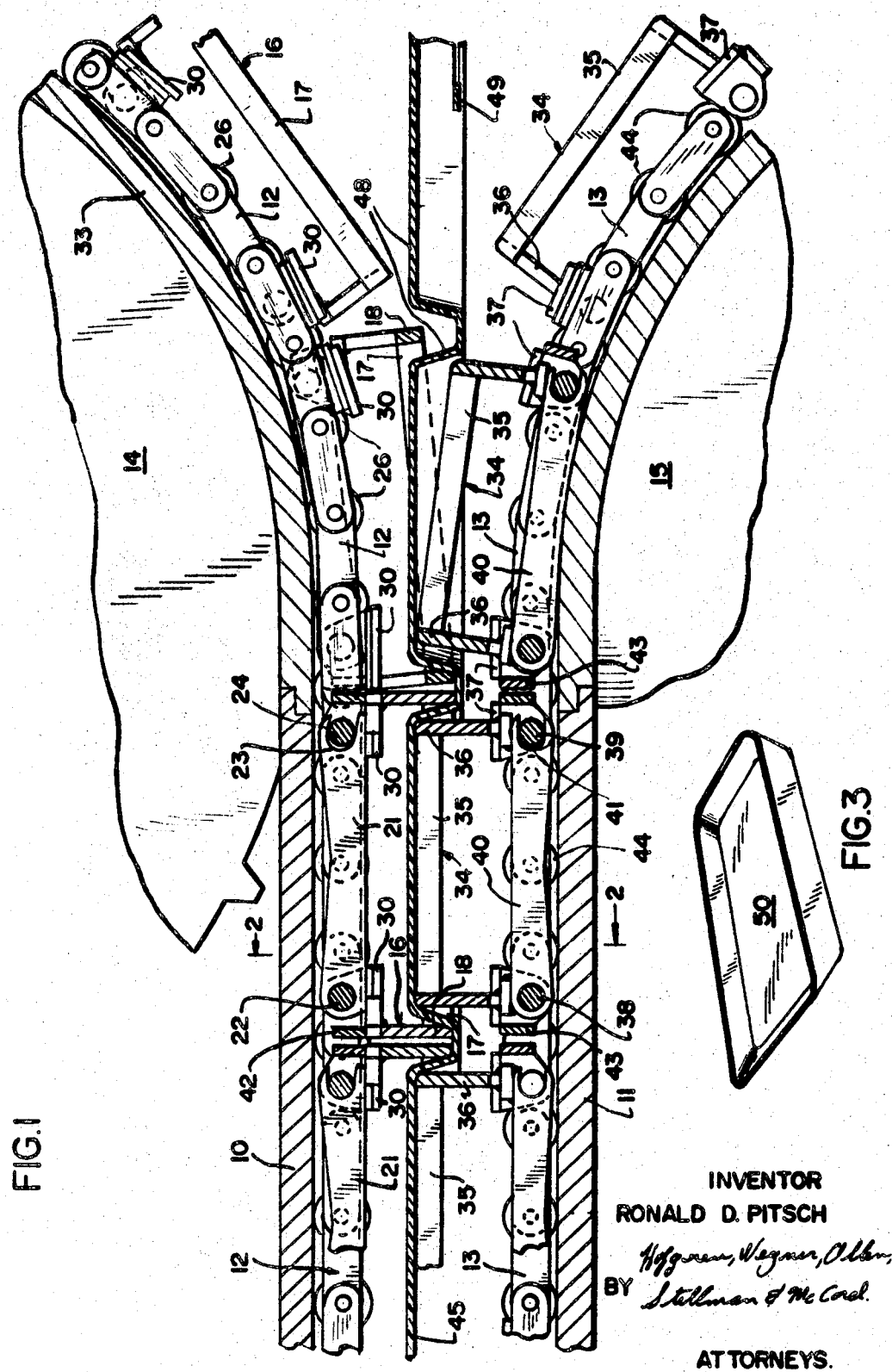

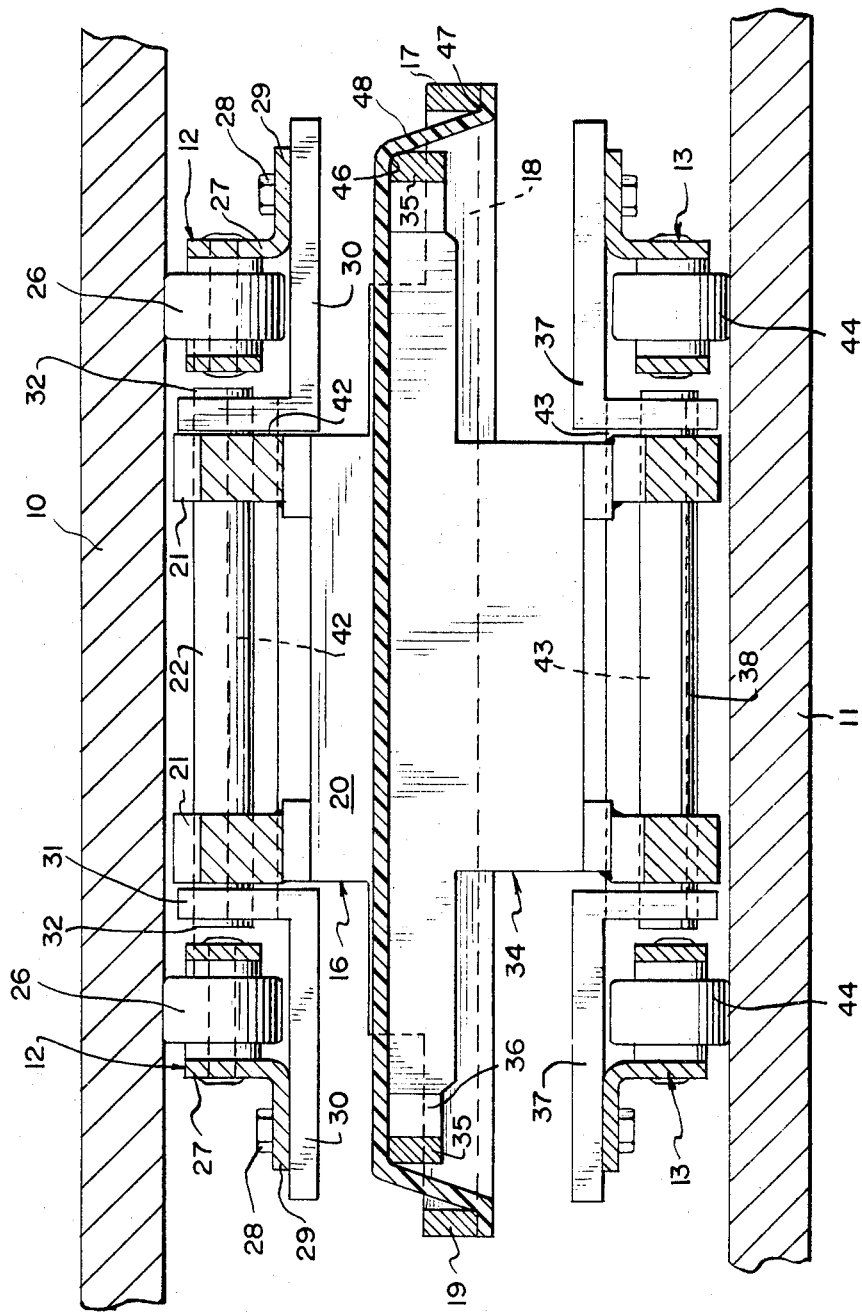

3,387,332
MOLDING APPARATUS
Ronald D. Pitsch, Oshkosh, Wis., assignor to American
Excelsior Corporation, a corporation of Delaware
Filed Aug. 18, 1966, Ser. No. 573,318
3 Claims. (Cl. 18—19)

This invention relates to an apparatus for forming a dish shaped receptacle having a bottom and sides and relates particularly to an apparatus for forming a series of such receptacles from a sheet of shapable material such as heated synthetic plastic.

Dish shaped receptacles such as shallow trays are widely used for packaging food materials such as fresh fruits and vegetables, meats and the like for sale to purchasers. It has previously been proposed to form these receptacles by the use of internesting molds with a sheet of the shapable material therebetween. In the present invention the sheet is likewise distorted to form a dish shaped distortion or distortions with the distortion being separated from the sheet as the dish shaped receptacle. However, in the present apparatus the shaping means for each receptacle formation is a pair of open internesting frames rather than internesting molds.

One of the features of this invention is to provide an improved apparatus for forming a dish shaped receptacle having a bottom and sides wherein a pair of cooperating shaping members each comprising a frame with sides and both frames being of similar shape and with a first frame of the pair being smaller than the second frame of the pair so as to fit within the second frame in internested relationship together with means for arranging a sheet of shapable material between the internested frames with the frames engaging the sheet on opposite sides thereof so that the sheet material is distorted around an outer edge of the smaller frame and around an inner edge of the larger frame to form a dish shaped distortion in the sheet together with means for separating the distortion from the sheet as a dish shaped receptacle.

Other features and advantages of the invention will be apparent from the following description of one embodiment thereof taken in conjunction with the accompanying drawings. Of the drawings:

FIGURE 1 is a fragmentary vertical sectional view of an apparatus embodying the invention for molding shallow plastic trays.

FIGURE 2 is a fragmentary vertical sectional view taken substantially along line 2—2 of FIGURE 1.

FIGURE 3 is a perspective view of a tray produced by the illustrated apparatus.

The apparatus shown in the accompanying drawings comprises upper and lower guides 10 and 11 arranged in generally oval shape to guide the movement of upper 12 and lower 13 parallel chains each driven in an endless oval path by drive sprockets 14 and 15, respectively. The chains 12 and 13 and the drive sprockets 14 and 15 are conventional and the same is true of guide or idler sprockets (not shown) that are similar to the drive sprockets but located at the opposite ends of the ovals traversed by the chains 12 and 13.

In the illustrated embodiment the upper chains 12 carry between them (FIGURE 2) a series of shaping frame members 16 each including a rectangular open frame 17 having opposite ends 18 and opposite sides 19. Each of the frames 17 is mounted on a pair of end brackets 20 each of which is attached to the corresponding ends of a pair of substantially parallel elongated bars 21. One corresponding end of the pair of bars 21 has attached thereto a transverse axle 22. The other end of each pair of bars 21 is formed with an end opening slot 23 in which is held a second transverse axle 24. Located outwardly of each bar 21 is one of the link chains 12 made up of individual links of customary construction connected in end-to-end relationship with the chain carrying a plurality of rollers 26 adapted to bear against the guide 10. Each link 27 of the chain 12 that is opposite an axle 22 and 24 is attached as by means of a bolt 28 and flange 29 to the base of a right angle flange 30 whose other side 31 is rotatable on the end 32 of a shaft 22 or 24 beyond a side bar 21.

The individual links in the chains 12 have sufficient loose fitting play so that the chain can pass around the curved portion 33 of the guide 10. When this occurs, of course, the chord between the centers of each pair of transverse axles 22 and 24 is shorter than the arc between these centers on the smaller portion 34 of the guide 10, which is equal to the distance between these centers when the chain is straight. In order to provide for this moving of the axles 22 and 24 toward each other on the curved portion 33 the end slot 23 in one end of each bar 21 is provided.

The smaller frame member 34 which carries the smaller frame 51 that cooperates with the larger frame member 16 to provide a cooperating pair has similar sides 35 and ends 36 and is similarly mounted on a flange 37 on the opposite ends of transverse axles 38 and 39 that are similar to the axles 22 and 24, respectively. This smaller frame member 34 is provided in the same manner as the larger frame with the elongated parallel bars 40 each having one end fixed in axle 38 and the other end provided with a slot 41 in which the adjacent axle 39 is movable relative to the other axle 38. In the larger frame member 16 the mounting brackets 30 at each end are interconnected by a cross bar 42. Similarly, in the smaller frame member 34 mounting brackets 37 at each end are connected by a cross bar 43.

As stated, the mountings for both frame members 16 and 34 are the same and the rollers 44 for the smaller frame member 34 are similar to the rollers 26 and likewise transport the series of smaller frame members on their guide 11.

With this construction the corresponding frame member of each pair of frame members is arranged in a closed path with each path having one portion shown as the horizontal portion in FIGURE 1 adjacent one portion of the other path to bring each pair of frame members 16 and 34 in internesting spaced relationship as shown in FIGURES 1 and 2. A sheet 45 of shapable material such as heated plastic material is directed between the internesting frame members so that the corresponding frame members 16 are on one side of the sheet and the frame members 34 are on the other. Because the frames are internested the sheet material thereby becomes distorted around an outer edge 46 of the smaller frame 35 and an inner edge 47 of the larger frame 17 to form a dish shaped distortion in the sheet of material as illustrated at 48 in FIGURES 1 and 2. Then, means are provided for separating the distortions 48 from the sheet as by means of a diagrammatically shown band saw 49. This provides a plurality of dish shaped receptacles here illustrated by the single tray 50 of FIGURE 3.

The sheet 45 is preferably of plastic material and may be any of those customarily used in making molded articles. Thus, it may be expanded polystyrene which is passed through the apparatus of this invention while in heated moldable condition.

Having described my invention as related to the embodiment shown in the accompanying drawings, it is my intention that the invention be not limited by any of the details of description, unless otherwise specified, but rather be construed broadly within its spirit and scope as set out in the accompanying claims.

I claim:

1. Apparatus for forming a dish shaped receptacle having a bottom and sides, comprising: a pair of cooperating shaping frame members each comprising a frame with sides having edges, both frames being of similar shape and a first frame being smaller than the second so as to fit therein in internested relationship; means for directing a sheet of shapable material in a path; means for arranging said shaping frame members on opposite sides of said sheet in internested relationship engaging said sheet with corresponding sides of both frames being spaced apart, the sheet material thereby being distorted around an outer edge of the smaller frame and around an inner edge of the larger frame to form a dish shaped distortion in said sheet; and means for separating said distortion from said sheet as a dish shaped receptacle.

2. The apparatus of claim 1 wherein both said outer edge and inner edge are smoothly rounded.

3. Apparatus for forming a series of dish shaped receptacles each having a bottom and sides, comprising: a plurality of pairs of cooperating shaping frame members, each frame member of each pair comprising a frame with sides having edges, both frames being of similar shape and a first frame being smaller than the second so as to fit therein in internested relationship; means for arranging the corresponding frame members of each pair in a closed path with each path having one portion adjacent one portion of the other path to bring each pair of frame members in internesting spaced relationship; means for directing a sheet of shapable material in a path between said path portions with said frame members of each pair on opposite sides of said sheet in internested relationship engaging said sheet with corresponding sides of both frames being spaced apart, the sheet material thereby being distorted around an outer edge of the smaller frame and around an inner edge of the larger frame to form a dish shaped distortion in said sheet; and means for separating said distortions from said sheet as dish shaped receptacles.

References Cited
UNITED STATES PATENTS

| | | |
|---|---|---|
| 2,879,696 | 3/1959 | Cox. |
| 3,265,265 | 8/1966 | Lewi. |
| 3,351,977 | 11/1967 | Gasch et al. |
| 3,357,044 | 12/1967 | Roesner. |

WILLIAM J. STEPHENSON, *Primary Examiner.*